United States Patent
Schubert

(10) Patent No.: US 10,328,938 B2
(45) Date of Patent: Jun. 25, 2019

(54) ADAPTIVE CRUISE CONTROL SYSTEM FOR MOTOR VEHICLES

(71) Applicant: Robert Bosch GmbH, Stuttgart (DE)

(72) Inventor: Michael Schubert, Althengstett (DE)

(73) Assignee: ROBERT BOSCH GMBH, Stuttgart (DE)

( * ) Notice: Subject to any disclaimer, the term of this patent is extended or adjusted under 35 U.S.C. 154(b) by 53 days.

(21) Appl. No.: 15/508,787

(22) PCT Filed: Jul. 31, 2015

(86) PCT No.: PCT/EP2015/067640
§ 371 (c)(1),
(2) Date: Mar. 3, 2017

(87) PCT Pub. No.: WO2016/037765
PCT Pub. Date: Mar. 17, 2016

(65) Prior Publication Data
US 2017/0259822 A1 Sep. 14, 2017

(30) Foreign Application Priority Data
Sep. 11, 2014 (DE) ........................ 10 2014 218 198

(51) Int. Cl.
*B60W 30/17* (2012.01)
*B60W 30/14* (2006.01)
(Continued)

(52) U.S. Cl.
CPC ............ *B60W 30/17* (2013.01); *B60W 10/04* (2013.01); *B60W 10/18* (2013.01); *B60W 30/14* (2013.01);
(Continued)

(58) Field of Classification Search
CPC .. B60W 30/14; B60W 30/143; B60W 30/146; B60W 30/16; B60W 30/162;
(Continued)

(56) References Cited

U.S. PATENT DOCUMENTS 6,580,996 B1 * 6/2003 Friedrich .............. B60W 30/16
701/96
8,229,644 B2 * 7/2012 Boecker et al. ...... B60W 30/16
701/96

(Continued)

FOREIGN PATENT DOCUMENTS

DE 10349434 A1 6/2004
DE 102006056631 A1 6/2008
(Continued)

*Primary Examiner* — Dale W Hilgendorf
(74) *Attorney, Agent, or Firm* — Norton Rose Fulbright US LLP; Gerard Messina

(57) ABSTRACT

An adaptive cruise control system for motor vehicles, including a sensor for measuring the distance to a preceding vehicle and an adaptive cruise controller for calculating control interventions into the drive system and/or braking system of the host vehicle for regulating the distance to a setpoint distance, a detuning parameter being adjustable in the adaptive cruise controller, which determines the intensity of the response of the adaptive cruise controller to control deviations, wherein a traffic jam detection module and a detuning controller which, with the detuning parameter as a manipulated variable, adjust the frequency of control interventions having an intensity above a certain minimum intensity to a setpoint frequency adapted to the traffic jam situation.

5 Claims, 2 Drawing Sheets

(51) Int. Cl.
*B60W 30/16* (2012.01)
*G08G 1/01* (2006.01)
*B60W 10/04* (2006.01)
*B60W 10/18* (2012.01)
*B60W 30/18* (2012.01)
*B60W 50/06* (2006.01)
B60W 40/04 (2006.01)
B60W 50/00 (2006.01)

(52) U.S. Cl.
CPC .......... *B60W 30/143* (2013.01); *B60W 30/16* (2013.01); *B60W 30/18018* (2013.01); *B60W 50/06* (2013.01); *G08G 1/0133* (2013.01); B60W 40/04 (2013.01); B60W 2050/0008 (2013.01); B60W 2050/0088 (2013.01); B60W 2420/52 (2013.01); B60W 2520/10 (2013.01); B60W 2520/105 (2013.01); B60W 2550/10 (2013.01); B60W 2550/20 (2013.01); B60W 2550/30 (2013.01); B60W 2550/306 (2013.01); B60W 2550/308 (2013.01); B60W 2710/18 (2013.01); B60W 2720/10 (2013.01); B60W 2750/308 (2013.01)

(58) Field of Classification Search
CPC ............... B60W 30/165; B60W 30/17; B60W 2550/20; G01G 1/0133
See application file for complete search history.

(56) References Cited

U.S. PATENT DOCUMENTS

| | | | |
|---|---|---|---|
| 2009/0276135 A1* | 11/2009 | Hagemann et al. | B60W 30/16 701/96 |
| 2012/0166059 A1* | 6/2012 | Aso | B60W 30/16 701/96 |
| 2015/0175162 A1* | 6/2015 | Nakadori | B60W 30/16 701/96 |
| 2016/0176402 A1* | 6/2016 | Andersson et al. | B60W 30/16 701/96 |

FOREIGN PATENT DOCUMENTS

| | | | |
|---|---|---|---|
| DE | 102008047771 A1 | 4/2010 | |
| DE | 102012202110 A1 * | 8/2013 | ............ B60W 30/16 |
| WO | 2007045523 A1 | 4/2007 | |

* cited by examiner

ADAPTIVE CRUISE CONTROL SYSTEM FOR MOTOR VEHICLES

FIELD

The present invention relates to an adaptive cruise control system for motor vehicles, including a sensor for measuring the distance to a preceding vehicle and an adaptive cruise controller for calculating control interventions in the drive system and/or braking system of the host vehicle for regulating the distance to a setpoint distance, a detuning parameter, which determines the intensity of the response of the adaptive cruise controller to control deviations, being adjustable in the adaptive cruise controller.

BACKGROUND INFORMATION

Motor vehicles are increasingly equipped with electronic velocity control systems and adaptive cruise control systems. During unimpeded driving, the velocity of the host vehicle is adjusted by the velocity controller to a setpoint velocity selectable by the driver. When following a vehicle, when a preceding vehicle is located ahead of the host vehicle, the distance and relative velocity of the preceding vehicle is measured with the aid of a radar sensor, and the distance is adjusted to a velocity-dependent setpoint distance by corresponding acceleration or deceleration of the host vehicle, so that the preceding vehicle is tracked with a predetermined time gap generally selectable by the driver.

Some systems of this type also offer the driver the option of influencing the control behavior by adjusting parameters of the adaptive cruise controller and adapting them to his/her personal wishes and preferences. In this way, it is possible, in particular, to choose between a more dynamic driving style, characterized by more rapid accelerations and, if necessary, correspondingly harder braking maneuvers, and a rather balanced, generally more fuel-saving driving style.

In certain traffic situations, for example, in traffic jam situations, considerable fuel savings could be achieved by the selection of the more balanced driving style. One problem, however, is that this attunement of the control system finds only little acceptance with many motor vehicle drivers since it does not match the intuitive driving behavior of the human driver.

SUMMARY

An object of the present invention is to provide an adaptive cruise control system, which enables fuel savings in certain traffic situations.

This object may be achieved according to the present invention by a traffic jam detection module and an detuning controller which, with the detuning parameter as a manipulated variable, adjusts the frequency of control interventions having an intensity above a certain minimum intensity to a setpoint frequency adapted to the traffic jam situation when the traffic jam detection module detects a traffic jam.

The present invention thus allows the adaptive cruise controller to be automatically detuned in traffic jam situations in such a way that the control behavior is changed in the direction of a reduction of the amplitude of the control interventions, in particular, of the accelerations and decelerations and, therefore, in the direction a fuel-saving driving style.

A particular advantage is that the detuning controller only gradually intervenes in the events if, as a result of the traffic jam, the frequency of more intense control interventions increases. As a response to the increasing frequency of such control interventions, the detuning parameter is modified in such a way that the frequency is returned to a normal level in spite of the traffic jam, which results in a transition to a fuel-saving driving style that is gradual and more acceptable to the driver. The detuning controller thus forms a superimposed control loop, which influences the control behavior of the adaptive cruise controller, specifically, with a time constant, which is greater than the time constant of the adaptive cruise controller itself. The adaptation to the respective traffic situation (frequency of the traffic jam-related switch between acceleration and deceleration) takes place automatically, in that a new balance is adjusted in the superimposed control loop. This eliminates the need for implementing specific algorithms for more closely analyzing the traffic situation and for adapting the control strategy according to the analysis results. Nor are any additional sensors (video sensors, navigation system, etc.) necessary for detecting the traffic surroundings.

Advantageous embodiments and refinements of the present invention are described herein.

The traffic jam may be detected in a conventional manner by measuring the positions and velocities of preceding vehicles with the aid of the radar sensor. In one advantageous specific embodiment, however, the traffic jam situation is detected based on the maximum velocity, which has been reached before a deceleration of the host vehicle (with a certain minimum intensity). The assessment of the maximum velocity in this case may be a function of the respective road type (urban traffic, country road or expressway). This method for detecting a traffic jam is based on the consideration that a frequent switch between acceleration and deceleration typically takes place in a traffic jam situation, only relative low maximum velocities being reached in the acceleration phases. If, on the other hand, the deceleration occurs after driving at relatively high maximum velocity, this need not (yet) be an indication of a traffic jam, but rather it may also be a one-time temporary disruption in the traffic flow. For the purposes of the present invention, it makes no difference whether the traffic situation detected in this way as a "jam" really is a traffic jam in the true sense. It is only important that, based on this criterion, situations may be detected in which a more balanced driving style promises significant fuel savings.

According to one refinement, different traffic jam situations may also be classified based on the maximum velocity reached prior to a deceleration. For example, typical figures of the maximum velocity are approximately on the order of 25 km/h for a slow traffic jam after accidents, on the order of approximately 40 km/h for a "normal" traffic jam with a lane constriction and on the order of approximately 60 km/h in slow-moving traffic with velocity fluctuations.

Based on this classification, it may then be established, depending on the situation, how high the minimum intensity of the control interventions counted when regulating the frequency should be. The minimum intensity is then established in such a way that control interventions below this minimum intensity may still be considered a feature of a fuel-saving driving style in view of the detected traffic jam class. In this case, the amount of acceleration and/or deceleration of the host vehicle preferably serves as a measure for the assessment of the intensity of the control interventions. In the case of a slow traffic jam, for example, a fuel-saving driving style may still be referred to if the deceleration, i.e., the negative acceleration of the host vehicle is $-1$ m/s$^2$. In the other traffic jam classes, i.e., in the case of lane constrictions or slow-moving traffic, the deceleration may also reach values up to −1.5 m/s²' for example, even with a fuel-saving driving style.

The precise definition of the detuning parameter is a function of the control algorithm used in the respective adaptive cruise controller. Generally, however, each control algorithm is described by a certain number of parameters, which establish the control behavior. An increase of the value of one parameter may then change the control behavior in the direction of a dynamic driving style or in the direction of a fuel-saving driving style, depending on the function of this parameter. The detuning of the adaptive cruise controller may then be controlled via these parameters. A single detuning parameter is advantageously defined, and the parameters of the control algorithm are then treated as functions (for example, monotonically decreasing or monotonically increasing functions) of this detuning parameter.

The detuning controller may operate, for example, in such a way that each time the intensity of the control intervention exceeds the established minimum intensity, it increases the detuning parameter by a fixed predefined increment, which corresponds to a detuning in the direction of a more fuel-saving driving style. In addition, the detuning parameter is decreased by a (small) decrement in each case upon expiration of a specific time interval, regardless of whether control interventions occur or not, until a specific minimum value is reached, which corresponds to the non-detuned controller or the attunement of the controller selected by the driver him/herself. Thus, sporadic decelerations of the host vehicle, for example, during a sequence of red lights in urban traffic, result in only sporadic, small increases of the detuning parameter, which are immediately reversed by the constant reductions of this parameter, and thus have practically no influence on the control behavior. In the case of more frequent decelerations in a traffic jam situation, on the other hand, the increases of the parameter may accumulate until finally a balance between the increases and decreases of the parameter is reached at a specific (setpoint) frequency of the control interventions. This balance value of the detuning parameter then corresponds to a control behavior, which is attuned to the respective traffic jam situation. When the traffic jam dissolves, the regular decrease of the detuning parameter ensures that the controller automatically and gradually returns again to the "normal" control behavior factory-adjusted or adjusted by the driver.

Another advantageous effect of the system according to the present invention is that it contributes to a compensation of velocity fluctuations in traffic jam situations and, in the process, counteracts the danger of these velocity fluctuations building up in the line of vehicles, potentially to the point of a vehicle standstill, and to an increased accident risk.

Exemplary embodiments are explained in greater detail below with reference to the figures.

DETAILED DESCRIPTION OF EXAMPLE EMBODIMENTS

Figure 1:
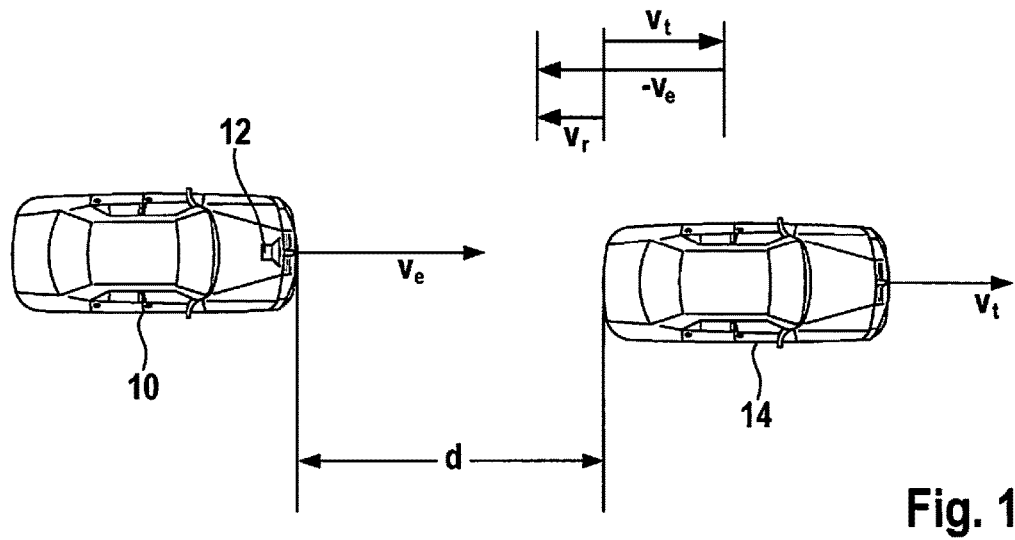
FIG. 1 shows a sketch of a vehicle following vehicle situation, in which the adaptive cruise control system according to the present invention is used.

FIG. 1 shows an outline of a motor vehicle 10, which is equipped with an adaptive cruise control system. This adaptive cruise control system also includes a radar sensor 12, which cyclically measures, in short intervals, distance d and relative velocity $v_r$ of a preceding vehicle 14. The intrinsic velocity of vehicle 10 equipped with the adaptive cruise control system is identified with $v_e$, and the velocity of vehicle 14 (preceding vehicle) is identified with $V_t$. The following applies: $v_r = v_t - v_e$.

Figure 2:
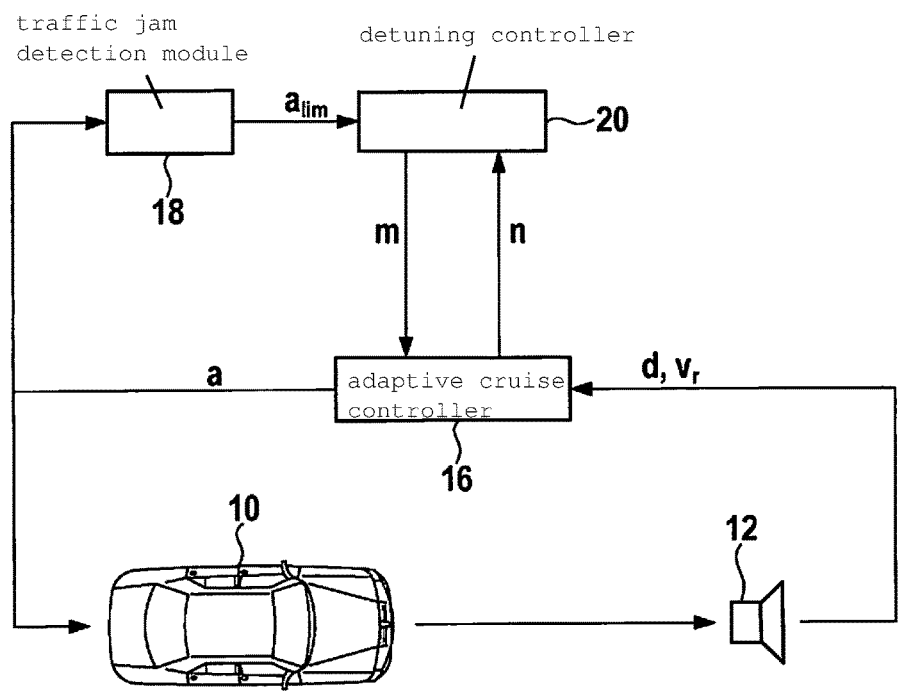
FIG. 2 shows a block diagram of the adaptive cruise control system.

The adaptive cruise control system depicted in FIG. 2 as a block diagram includes an adaptive cruise controller 16, which evaluates the measured values d and $v_r$ in each measuring cycle of radar sensor 12 and computes therefrom a new setpoint value for acceleration a (or in the case of negative a, the deceleration) of vehicle 10. This setpoint value is then converted into an actual acceleration by the drive system or braking system of vehicle 10, with the result that distance d and relative velocity $v_r$ of vehicle 14 change, and thus other values are measured by radar sensor 12 in the next measuring cycle, with which the control loop is closed. A control algorithm of adaptive cruise controller 16 ensures that distance d to vehicle 14 is adjusted to a specific setpoint distance $d_{setpoint}$.

Indicated below merely as an example is a formula (1), on which the control algorithm of adaptive cruise controller 16 may be based.

$$a_i = \mathrm{MIN}(a_v, a_e, (\mathrm{MIN}(a_{i-1}+a_+, a_{max}, \mathrm{MAX}(a_{i-1}-a_-, \alpha(d-d_{setpoint})+\beta v_r))) \tag{1}$$

In this formula, $a_i$ is the setpoint acceleration, which is calculated in the instantaneous measuring cycle.

(Positive) parameter α indicates the (in this example, linear) dependency of the setpoint acceleration on the control deviation $d-d_{setpoint}$. If actual distance d becomes smaller than setpoint distance $d_{setpoint}$, term $\alpha \, (d-d_{setpoint})$ becomes negative, and the controller accordingly outputs a negative setpoint acceleration in order to decelerate vehicle 10.

(Positive) parameter β indicates the dependency of the setpoint acceleration on relative velocity $v_r$. If, for example, the control deviation $(d-d_{setpoint})$ equals zero and $v_r$ is negative, i.e., the distance between vehicles 10 and 14 becomes smaller, then factor $\beta \, v_r$ is also negative, corresponding to a deceleration of the host vehicle, as a result of which $v_r$ is again reset to zero.

Variable $a_{i-1}$ indicates the setpoint acceleration, which was calculated in the previous measuring cycle and which now, since the setpoint acceleration is converted by the drive system or braking system into an actual acceleration, corresponds to the instantaneous acceleration of vehicle 10. Variables $a_+$ and $a_-$ define a corridor, within which the new setpoint acceleration $a_i$ may change relative to the previous setpoint acceleration $a_{i-1}$. Variable $a_{max}$ indicates an absolute upper limit for the setpoint variable.

Variable $a_v$ is provided by a cruise control system not shown and normally has the value $a_{max}$, so that it is ineffective. It assumes a lower value only if velocity $V_e$ of the host vehicle increases beyond the setpoint velocity selected by the driver.

Variable $a_e$ is provided by a collision avoidance system not shown and also normally has the value $a_{max}$, i.e., it is ineffective. The collision avoidance system calculates a negative value $a_e$, which is necessary in order to avert a collision, only if the collision avoidance system determines that an acute risk of a collision with preceding vehicle 14 is imminent.

FIG. 2 also shows a traffic jam detection module 18, which tracks chronological acceleration curve a of vehicle 10 as well as the chronological curve of intrinsic velocity $v_e$. As long as acceleration a is above a specific negative threshold value of, for example, $-1$ m/s$^2$, traffic jam detection module 18 stores in each case the previously achieved maximum of intrinsic velocity $v_e$. Once acceleration a drops below the threshold value, traffic jam detection module 18 decides on the basis of this maximum velocity reached whether a traffic jam exists and, if necessary, to which class this traffic jam belongs.

If the stored maximum velocity is greater than, for example, 60 km/h, traffic jam detection module 18 then decides that no traffic jam exists. If the maximum velocity is below 60 km/h but above a second threshold value of, for example, 25 km/h, traffic jam detection module 18 then decides that slow-moving traffic or else a light traffic jam exists, as typically occurs in the case of lane constrictions. In this case, a threshold value $a_{lim}$ for the acceleration is set at, for example, $-1.5$ m/s$^2$ and conveyed to a detuning controller 20.

If the stored maximum velocity is below 25 km/h, traffic jam detection module 18 decides that a slow traffic jam (stop and go) exists, and threshold value $a_{lim}$ is set at $-1.0$ m/s$^2$.

Following this decision, the stored maximum velocity is deleted and the velocity recording starts over again.

As is symbolically depicted in FIG. 2, detuning controller 20 responds to a frequency n of events, in which the setpoint acceleration calculated by adaptive cruise controller 16 drops below $a_{lim}$. As a function of this frequency n, detuning controller 20 outputs an detuning parameter m to adaptive cruise controller 16, which influences the behavior of the adaptive cruise controller by modifying one or multiple of parameters $\alpha$, $\beta$, $a_{max}$, $a_+$, $a_-$.

Parameter $\alpha=\alpha(m)$, for example, may be a monotonically decreasing function of m. If m becomes greater, the adaptive cruise controller consequently responds more tolerantly to control deviations $(d-d_{setpoint})$.

$\beta=\beta(m)$ may likewise also be a monotonically decreasing function of m, so that the adaptive cruise controller tolerates greater fluctuations of relative velocity $v_r$.

$a_{max}=a_{max}(m)$ may also be a monotonically decreasing function of m, with the result that as m increases, the maximum velocity of vehicle 10 decreases.

In one modified specific embodiment, $d_{setpoint}$ could also be modified as a function of m or be replaced by a tolerance interval as a function of m.

Figure 3:
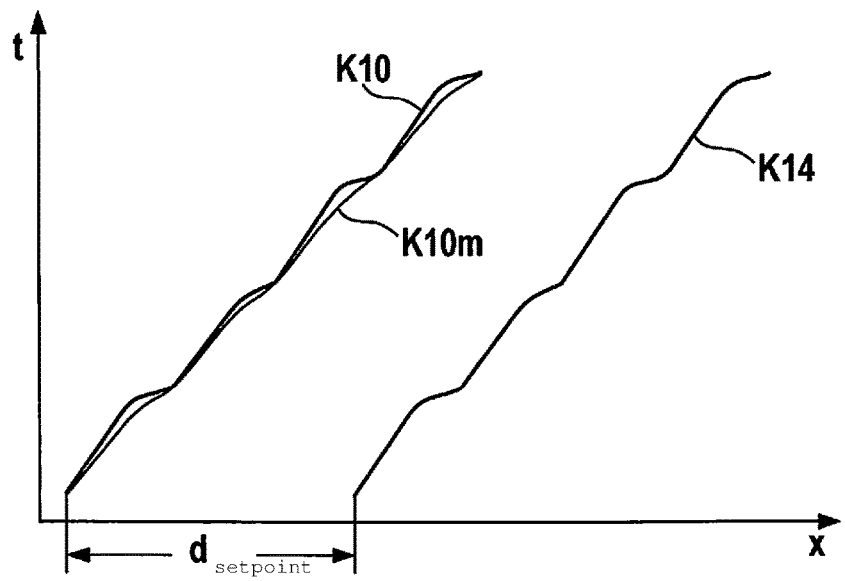
FIG. 3 shows a position/time diagram for explaining the mode of operation of the adaptive cruise control system according to the present invention.

The effect of detuning parameter m is graphically illustrated in FIG. 3. Curve K14 in FIG. 3 shows position x of vehicle 14 as a function of time t for a typical traffic jam situation with alternating acceleration phases and deceleration phases. Curve K10 in FIG. 3 shows the corresponding position/time curve of vehicle 10 in the event adaptive cruise controller 16 is not detuned (m=0). In this case, the controller maintains distance d virtually constant at setpoint value $d_{setpoint}$, so that curve K10 is practically a copy of curve K14 displaced along the x-axis. Host vehicle 10 therefore also experiences all accelerations and decelerations of preceding vehicle 14, which in general results in an increased fuel consumption. In practice, distance d will fluctuate by $d_{setpoint}$ within a certain bandwidth, which is a function of the attunement of the adaptive cruise controller, which, however is not depicted in FIG. 3.

Curve K10m in FIG. 3 illustrates the case in which adaptive cruise controller 16 is detuned (m>0). The result is that greater control deviations $(d-d_{setpoint})$ are permitted, so that in the acceleration phases, vehicle 10 accelerates less vigorously and accordingly needs to be braked less vigorously in the deceleration phases. Frequency n decreases accordingly and a significantly more fuel-saving driving style is achieved.

Figure 4:
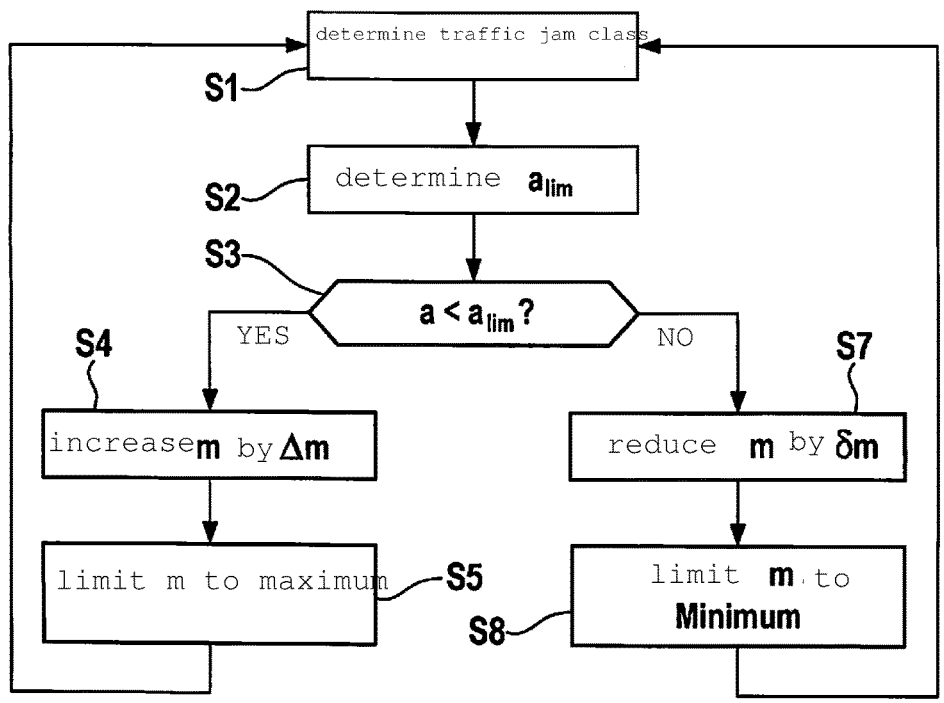
FIG. 4 shows a flow chart for explaining the functioning of the adaptive cruise control system.

FIG. 4 depicts the functioning of the above described adaptive cruise control system in a flow chart. The sequence of steps according to this flow chart is carried out cyclically, for example, in intervals of one second, of one tenth of a second or the like. In step S1, the traffic jam class is determined based on the maximum velocity of the host vehicle last stored in traffic jam detection module 18. In step S2, a threshold value $a_{lim}$ corresponding to the traffic jam class is set. In step S3, it is then checked whether instantaneous setpoint acceleration a instantaneously output by adaptive cruise controller 16 is less than $a_{lim}$. If that is the case, detuning parameter m is increased in step S4 by a specific increment $\Delta$m by detuning controller 20. If in the process the detuning parameter exceeds a specific maximum value, it is limited in step S5 to this maximum value. A jump is subsequently made back to step S1, and the sequence of steps is run through again in the next cycle.

If the query in step S3 indicates that the vehicle has not been so vigorously braked and thus, the threshold value $a_{lim}$ has not been undercut, the detuning parameter is reduced in step S7 by a decrement $\delta$m. If in the process the detuning parameter drops below a certain minimum value, for example, the value zero, it is limited in step S8 to the minimum value, and a jump is subsequently again made back to step S1.

Decrement $\delta$m is smaller in terms of absolute value than increment $\Delta$m and amounts, for example to $\frac{1}{20}$ $\Delta$m. When the sequence of steps according to FIG. 4 is run through in one second intervals, for example, this means that detuning parameter m persists practically at the standard value zero, if within a period of twenty seconds the acceleration of vehicle 10 is below $a_{lim}$ for no more than one second. The increase of m in step S4 predominates only if braking operations accumulate, in which $a_{lim}$ is undercut, so that the adaptive cruise controller is gradually detuned in the direction of a more balanced driving style. If the frequency of these more vigorous brake applications decreases again, the detuning declines again in step S7 in accordance with decrements $\delta$m.

In the example described above, the duration of the individual braking operations, i.e. the duration of the times, in which $a_{lim}$ is undercut, also has an influence on the detuning. A specific embodiment is also conceivable, however, in which step S4 is carried out only once, as soon as the acceleration drops below threshold value $a_{lim}$, and the jump back to S1 is carried out only after $a_{lim}$ has at least briefly been exceeded again.

Specific embodiments are also conceivable, in which detuning controller 20 responds not only to the frequency of vigorous braking operations (undercuttings of $a_{lim}$) but additionally also to vigorous acceleration operations.

What is claimed is:

1. An adaptive cruise control system for a host motor vehicle, comprising:
   a sensor for measuring a distance to a preceding vehicle;
   an adaptive cruise controller for calculating control interventions into at least one of a drive system and a braking system of the host motor vehicle for regulating the distance to a setpoint distance, a detuning parameter being adjustable in the adaptive cruise controller, which determines an intensity of a response of the adaptive cruise controller to a control deviation, wherein the detuning parameter is adjustable based on a comparison of an instantaneous setpoint acceleration of the host motor vehicle with a threshold acceleration;

a traffic jam detection module; and a detuning controller which, with the detuning parameter as a manipulated variable, adjusts a frequency of control interventions having an intensity above a minimum intensity to a setpoint frequency adapted to a traffic jam situation when the traffic jam detection module detects a traffic jam, wherein the threshold acceleration is a negative threshold value, and wherein the traffic jam detection module in each case records a maximum value of an intrinsic velocity of the host motor vehicle achieved up to a point in time at which an acceleration of the host motor vehicle drops below the negative threshold value, and decides that the traffic jam exists, if the maximum value reached is below a specific value, and wherein the detuning controller counts control interventions, in which the acceleration of the host motor vehicle drops below the negative threshold value, which indicates the minimum intensity of the control intervention.

2. The adaptive cruise control system as recited in claim 1, wherein the detuning controller establishes the minimum intensity of the control interventions as a function of the maximum value of the intrinsic velocity, on the basis of which the traffic jam detection module has detected the traffic jam.

3. The adaptive cruise control system as recited in claim 1, wherein the detuning controller reduces the detuning parameter at regular time intervals in each case by a specific decrement and increases by a specific increment the detuning parameter with each undercutting of the negative threshold value, which indicates the minimum intensity.

4. The adaptive cruise control as recited in claim 1, wherein the adaptive cruise controller carries out a control algorithm, which is characterized by a number of parameters, and at least one of these parameters is a function of the detuning parameter.

5. The adaptive cruise control as recited in claim 1, wherein the control deviation is a difference between the distance and the setpoint distance.

* * * * *